(No Model.) 3 Sheets—Sheet 2.
J. J. BISHOP.
COMBINED COOKING AND CAN FILLING APPARATUS.
No. 383,792. Patented May 29, 1888.
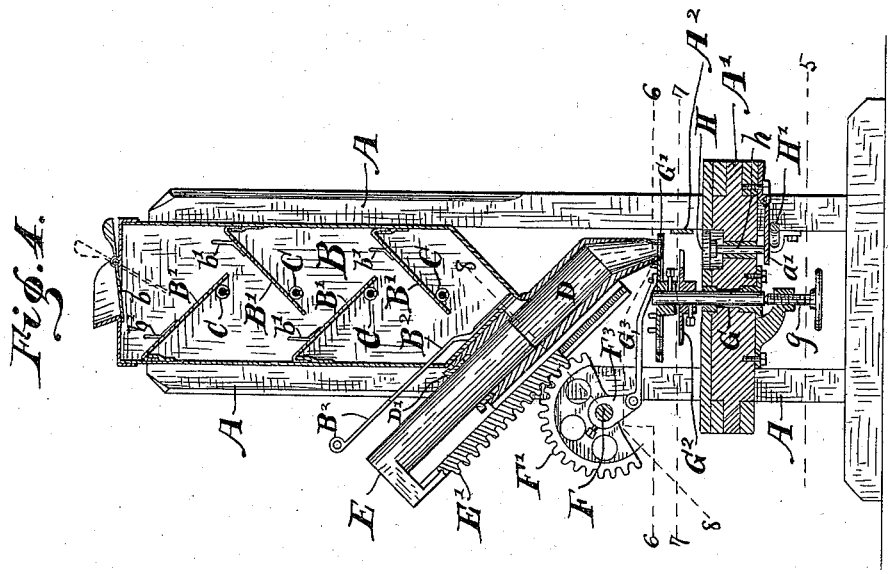
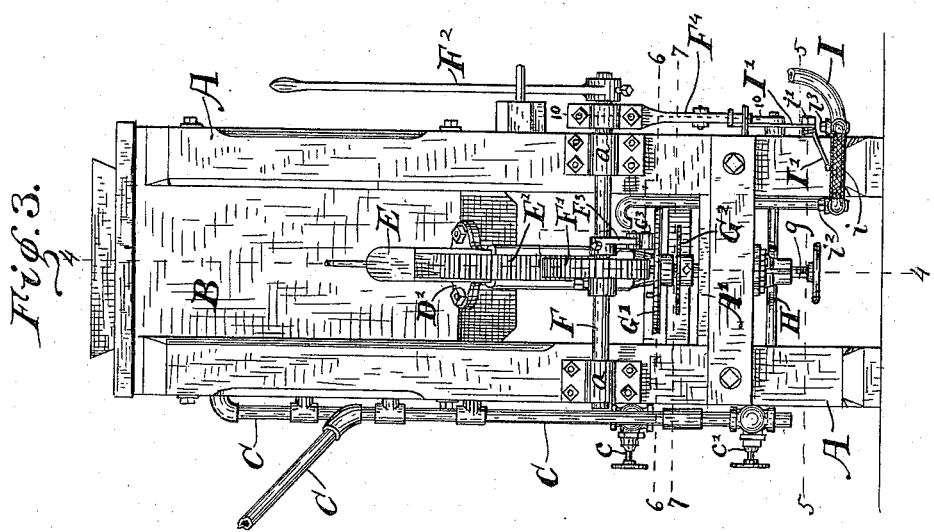
WITNESSES.
Chas. N. Leonard,
Charles R. Thurber.
INVENTOR.
John J. Bishop,
PER
C. Bradford,
ATTORNEY.

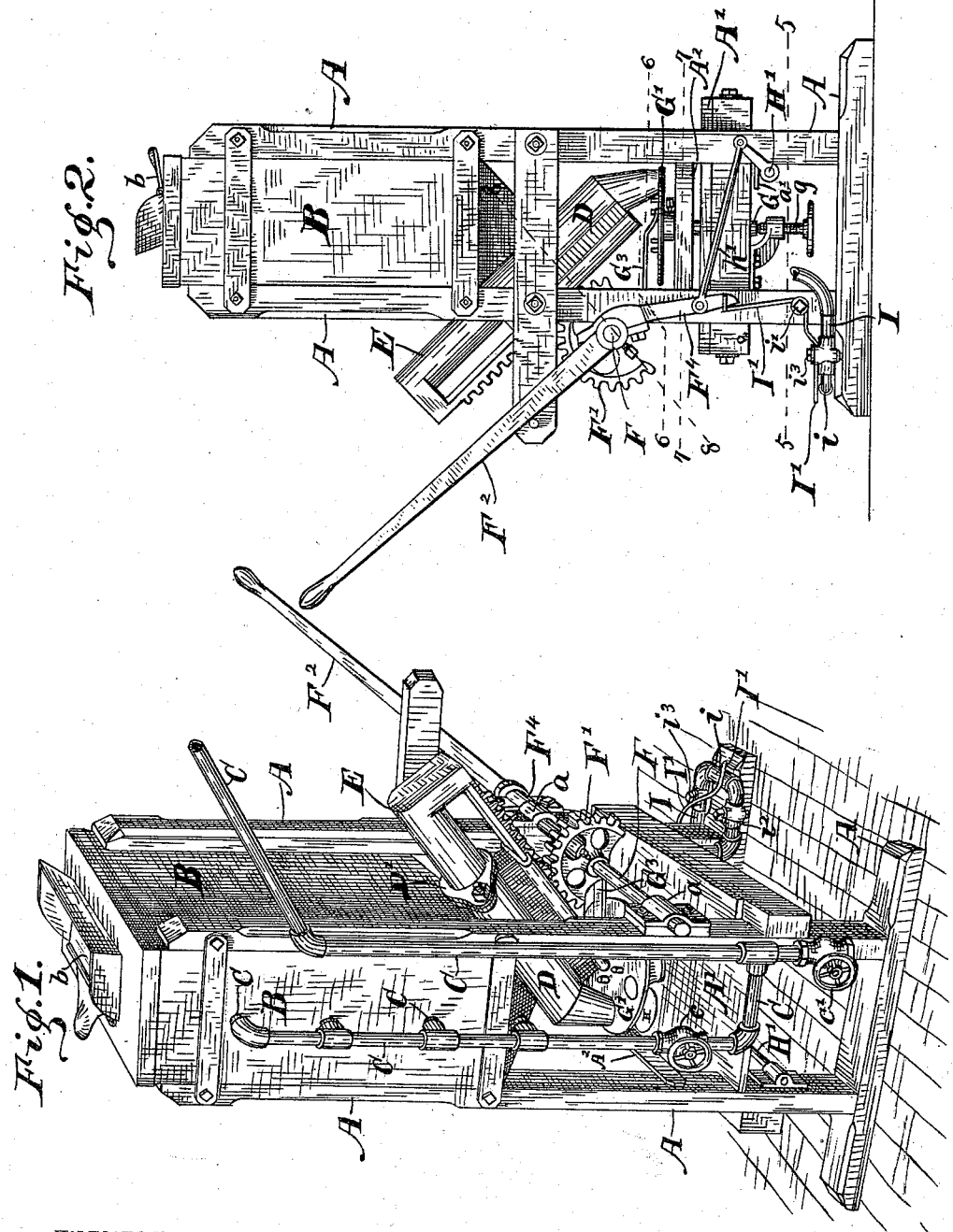

(No Model.) 3 Sheets—Sheet 3.
J. J. BISHOP.
COMBINED COOKING AND CAN FILLING APPARATUS.
No. 383,792. Patented May 29, 1888.
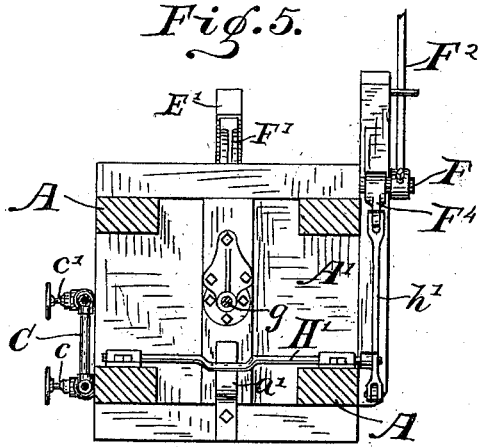
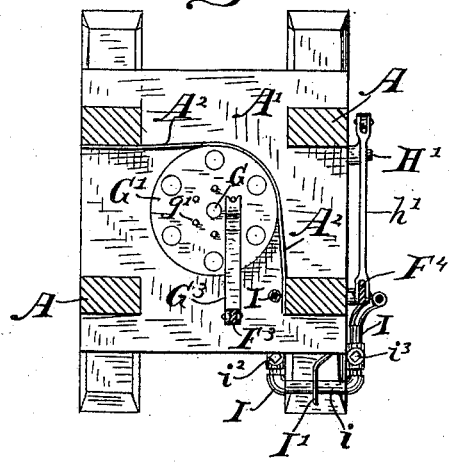
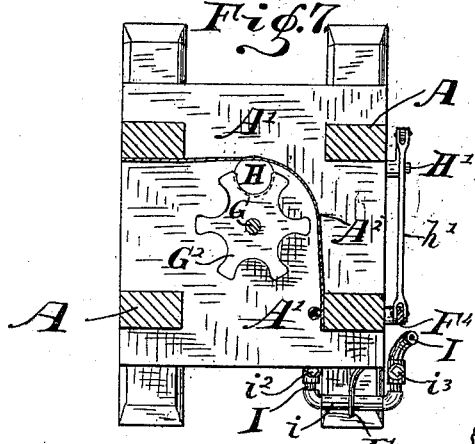
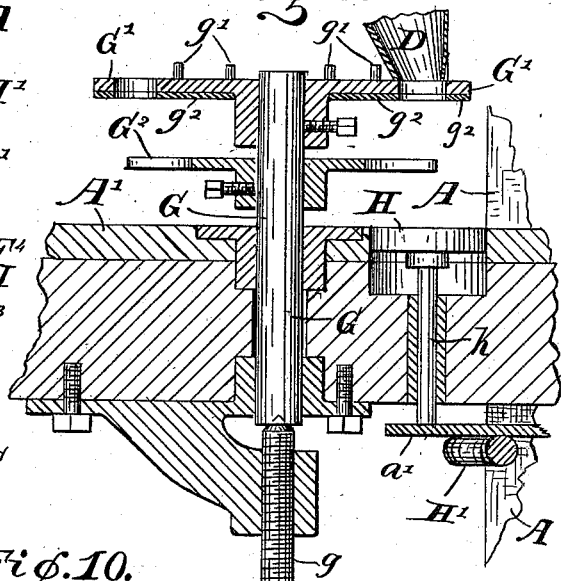
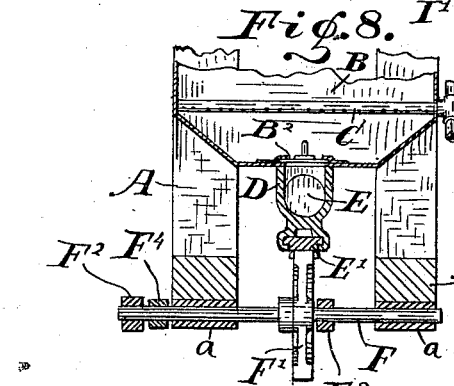
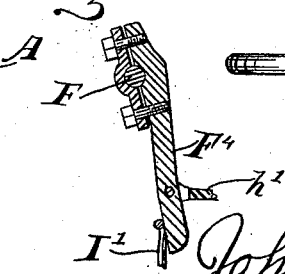
WITNESSES.
Chas. N. Leonard,
Charles L. Thurber.
INVENTOR.
John J. Bishop,
PER C. Bradford
ATTORNEY.
N. PETERS, Photo-Lithographer, Washington, D. C.

UNITED STATES PATENT OFFICE.

JOHN J. BISHOP, OF GREENWOOD, INDIANA, ASSIGNOR OF ONE-THIRD TO HARRY WOOD, OF SAME PLACE.

COMBINED COOKING AND CAN-FILLING APPARATUS.

SPECIFICATION forming part of Letters Patent No. 383,792, dated May 29, 1888.

Application filed August 23, 1887. Serial No. 247,645. (No model.)

*To all whom it may concern:*

Be it known that I, JOHN J. BISHOP, of the town of Greenwood, county of Johnson, and State of Indiana, have invented certain new and useful Improvements in Combined Cooking and Can-Filling Apparatus, of which the following is a specification.

The object of my said invention is to produce a machine by which corn and such like articles may be both cooked and packed in cans in the process of preparing what are known as "canned" goods for the market.

The various features of said invention will first be fully described in the specification and then pointed out in the claims.

Referring to the accompanying drawings, which are made a part hereof, and on which similar letters of reference indicate similar parts, Figure 1 is a perspective view of a machine embodying my said invention; Fig. 2, an end elevation of the same; Fig. 3, a side elevation; Fig. 4, a central vertical sectional view looking toward the right from the dotted line 44 in Fig. 3; Fig. 5, a horizontal sectional view looking upwardly from the dotted line 5 5; Fig. 6, a similar view looking downwardly from the dotted line 6 6; Fig. 7, a similar view looking downwardly from the dotted line 7 7; Fig. 8, a sectional view looking upwardly from the diagonal dotted line 8 8; Fig. 9, a detail sectional view, on an enlarged scale, similar to a portion of Fig. 4, illustrating the construction at and near the point of the hopper more clearly; and Fig. 10 a detail sectional view on the dotted line 10 10 in Fig. 3.

In said drawings the portions marked A represent the frame-work of the machine; B, the cooking-box; C, the system of steam-pipes; D, the hopper; E, a plunger in said hopper; F, a shaft by which said plunger and certain other mechanism are operated; G, the shaft to the can-manipulating mechanism; H, a movable platform on which each can rests while being filled, and I a pipe or tube by which a liquid is introduced into the cans before filling.

In the process of putting up canned goods, especially corn, for which this invention is particularly designed, it is necessary that the article be thoroughly cooked; that it shall be well packed; that a small quantity of salt-water shall be introduced into each can; that provision be made to prevent the article from being spilled while being introduced into the cans, and that the cans be passed rapidly through the machine. These results are attained in my machine, as will now be described.

The frame-work A supports the mechanism and cooking-box, and also a platform, A', upon which the cans to receive the cooked article rest while the work is going on. Bearings $a$ are attached to this frame-work for the shaft F, and a bearing in the platform A' receives the shaft G. Other minor bearings or boxes are also provided, as shown, and a guide or way, $A^2$, guides the cans as they pass through the machine.

The cooking-box B is secured in the upper part of the frame-work A. It is provided in its interior with a series of inclined shelves, B', (best shown in Fig. 4,) which partially overlap each other and rest near their inner ends upon the steam-pipes C, being secured at their outer ends to the interior of the box. Its cover is in the form of a hopper, or rather is a tilting plate surrounded by a hopper-like rim, and is so balanced upon one edge of the opening that it will remain closed at all times, except when weight or force is applied to the upper side, which moves it down and open. In operation the corn or other article is thrown upon the top of this tilting cover, which, yielding under the weight, permits the corn to drop inside the cooking-box, when the cover immediately returns to its position, thus keeping the cooking-box closed and preventing the steam from escaping. The ordinary position of this tilting cover $b$ is shown in full lines in Fig. 4, and its tilted position, as when operated by the weight of the corn thereon, is shown in the same figure by dotted lines. At the lower end this cooking-box is contracted and approaches a point where an opening is formed which discharges into the hopper D. A gate, $B^2$, is provided, by which this opening may, when desired, be closed, which, however, when the machine is in active operation, is not often the case, but at times, as when an accident happens, is quite desirable. Each one of the shelves B' is provided with a handle, b', by which it can be removed from the cooking-box when desired.

The steam-pipes C consist of a main supply-pipe running alongside the cooking-box, and preferably as many cross-pipes as there are shelves in the interior of said box. Those portions of these cross-pipes which are inside said cooking-box are perforated, so as to permit the steam to escape into said box. These perforations are preferably directed toward the shelves immediately beneath them, so that the steam escaping through said perforations will be discharged against said shelves with some force, thus subjecting the article being cooked to not only the direct action of the live steam as a cooking agent, but also as a means of assisting it in its movement down the shelves. The shelves are also kept hot by the direct contact of the steam and the pipes, and thus aid in the cooking. A valve, c, is provided, by which the flow of steam may be altogether cut off when desired, and a drip-cock, c', by which the water of condensation may be allowed to escape.

The hopper D is secured in an inclined position beneath the cooking-box B, and communicates therewith. Its point or discharging end is arranged in close proximity to the plate which passes over the cans in the can-manipulating mechanism, and in its upper end is located the plunger E. At said upper end a stuffing-box, D', is preferably provided to prevent the escape of steam.

The plunger E is mounted in the hopper D, and is adapted to move up and down therein, being preferably operated by a rack and pinion, the rack E' of which is firmly secured to itself, and the pinion F' (or segment) being secured to the shaft F. This plunger is so arranged that as it is drawn back to the position shown in Fig. 4 a charge of corn sufficient to fill a can is permitted to flow into the hopper through the opening in the bottom of the cooking-box, and as said plunger is forced forward (a can being in position) said charge of corn is forced into said can thereby, and this operation is continually repeated, as will be readily understood.

The main shaft F is mounted in the bearings a on the frame A, and carries the pinion or segment F', which engages with the rack-bar E' on the plunger E. It is also provided with a lever-like handle, F², by which it is operated, an arm, F³, by which the can-manipulating mechanism is revolved, and an arm, F⁴, by which, through other appropriate mechanism, the movable platform for the cans is operated, and also the supply of salt-water to said cans is regulated. In operation said shaft is simply rocked back and forth by the operator by means of the lever or handle F².

The shaft G of the can-manipulating mechanism is mounted vertically in a bearing in the platform A', and preferably upon an adjustable step-bearing, g. Upon its upper end is a disk, G', in which are perforations of nearly the same size as the openings in the cans to be filled, and farther down on said shaft is secured another disk, G², in which are semicircular notches to receive the cans and carry them forward. Projecting upwardly from the disk G' are pins g', with which a pawl, G³, connected to the arm F³ on the shaft F, engages. These pins correspond in number with the holes in the disk G' and the notches in the disk G², and thus at each movement of the shaft F this can-manipulating mechanism is revolved a sufficient distance to bring a can into position to receive its charge of corn. The under side of the disk G' is preferably covered with rubber or some other elastic material g², with which the top of the cans will come in immediate contact while being filled, and thus be kept tightly closed, the disk G' acting as a cover for the cans during this operation. The close contact of the parts is secured by the operation of the movable platform H, as will be presently described. The vertical adjustment can be properly maintained by the adjustable step g, on which the shaft G rests.

The movable platform H is of the proper size to receive a single can, and is arranged directly below the discharging-opening in the hopper D. Normally, it is flush with the top of the platform A'; but when a can is to be filled (by the means which will be presently described) it is forced upwardly, carrying a can firmly against the under side of the disk G', and also bringing said disk G' into close contact with the end of the hopper D, thus making a perfectly tight joint (except the slight opening purposely provided for the escape of air from the can by slightly indenting one side of the point of the hopper, as shown most plainly in Fig. 9) between the hopper and the disk G' and between said disk and the can while said can is being filled. The stem h of this movable platform extends down through the platform A' and rests upon a bar, a', secured to the frame-work or platform by a hinge or spring, and is adapted to be operated by a crank or cam-shaft, H', which in turn is operated through the connecting-rod h' by the arm F⁴ on the shaft F. As the can-manipulating mechanism is all operated directly from the shaft F, a uniformity of movement is of course secured.

The pipe or tube I is connected with a receptacle (not shown) containing water which has been suitably impregnated with salt, and its inner end is arranged just above where the empty cans are introduced into the machine. This pipe has a flexible section, i, where it crosses the foot of the frame-work, and a bell-crank lever, I', is pivoted to the frame-work at i', with one end resting on this flexible portion i and the other against the arm F⁴ on the shaft F. The result is, when said shaft is operated, that the bell-crank lever will press upon the flexible portion, forcing a small quantity of the water therein out of the open end of the pipe, and when the lever is drawn back the pressure will be released, allowing the water to flow in from the receptacle and fill the space. By this means a small quantity of said water is squirted into each can as it passes the point where the discharge end of this pipe I is located. Stop-cocks $i^2$ $i^3$ are provided on each side of this flexible portion $i$, so that the water may be shut off altogether when desired.

As the stroke for the other purposes of the invention is necessarily considerably longer than is required to operate the shaft H' and the bell-crank lever I', the arm $F^4$ is secured to the shaft F in such a manner that when a certain pressure has been reached to permit it to slip thereon. This is illustrated particularly in Fig. 10.

The operation is as follows: One person (usually a boy) stands alongside the machine near the point where the discharge end of the pipe I is located, and places the cans, one by one, on the platform A, shoving them along so that they engage with the notches in the disk $G^2$. Another stands on the other side of the machine, near the vertical pipe C, and takes off the filled cans as they come through. The principal operator stands near the handle or lever $F^2$ and works it rapidly back and forth, while still another person is continually introducing the article to be cooked into the cooking-box. The result is that the corn or other article is cooked and canned very rapidly.

Having thus fully described my said invention, what I claim as new, and desire to secure by Letters Patent, is—

1. The combination of the cooking-box B, containing a series of shelves extending alternately from the opposite sides of said box toward its center, and steam-supply pipes C, the branches of which extend inside said box and are perforated, and upon which the inner ends of said inclined shelves rest, substantially as shown and described.

2. The combination of the cooking-box, a series of shelves therein extending on an incline from each side of said box alternately toward its center, and a series of perforated steam-pipes extending inside said box between said shelves.

3. The combination of the cooking-box B, terminating in an opening at the lower end, the hopper D, with which said opening communicates, and a plunger in said hopper.

4. The combination of the cooking-box B, terminating in an opening in its lower end, a hopper, D, with which said opening communicates, and a gate by which said opening may be closed, substantially as set forth.

5. The combination of the cooking-box, the hopper with which it communicates, the plunger in said hopper, and a rack and pinion by which said plunger is operated.

6. The combination of the hopper for receiving the cooked article, the cooking apparatus arranged to discharge into said hopper, a revolving disk containing openings arranged beneath the mouth of said hopper, and a movable platform below said revolving disk, upon which cans may be placed and brought to and beneath the mouth of the hopper and the opening in the revolving disk, the opening in said disk thus serving, while the can is being filled, as an opening in the top of said can, substantially as set forth.

7. The combination, in a combined cooking and can-filling apparatus, of the cooking-box, a hopper arranged to receive the substance from said cooking-box, a plunger mounted to fit closely and slide in said hopper, a rock-shaft geared to said plunger for operating it, a revolving disk for receiving the cans and carrying them forward, and a connection between said rock-shaft and said disk, whereby the plunger and the disk may be operated simultaneously, substantially as set forth.

8. The combination of a hopper, a revolving disk arranged below the mouth of said hopper and containing holes, a second disk arranged on the same shaft therewith and containing notches for receiving cans, a discharging device in said hopper, the mechanism for simultaneously operating said disks, and a vertically-movable platform arranged below the mouth of said hopper for receiving cans successively as they reach that point, and the mechanism for giving to said movable platform a vertical movement, whereby the cans are brought into close contact with the disk containing the holes, and thus tightly closed, except as to the opening in said disk immediately above it, substantially as set forth.

9. The combination of the revolving disk G', having holes therein and faced on the under side with a yielding or elastic material, a vertically-movable platform, H, and the mechanism by which said movable platform is operated, and the can at the time resting on said movable platform brought into close contact with the under side of said disk G'.

10. The combination of a hopper for receiving cooked articles, the apparatus for cooking the same arranged to discharge into said hopper, a discharging device therein, a revolving device for moving the cans to and beneath the discharging-point of said hopper, a vertically-movable platform for bringing said cans up closely into position to be filled, a rock-shaft, and connections between said rock shaft and the discharging device in the hopper, substantially as set forth.

11. The combination of the rock-shaft F, having an arm, $F^3$, and a pawl pivoted to said arm, a vertical shaft, G, having the disks G' and $G^2$, one of which is provided with pins or projections with which said pawl will engage, whereby as said shaft F is rocked said shaft G and the disks thereon are revolved, substantially as set forth.

12. The combination of the rock-shaft F, the arm $F^4$ thereon, a vertically-movable platform, H, having a spindle, $h$, which extends down and rests on a hinge or spring-bar, a cam or crank-shaft by which said hinge or spring-bar may be moved, and a connecting-rod between a crank-arm on said shaft and the arm $F^4$ on the shaft F.

13. The combination, in a cooking and can-filling machine, of a water-supply pipe, I, containing a flexible section, and a lever running to said flexible section from the can-manipulating mechanism, whereby the liquid in said pipe is periodically forced out into the cans simultaneously with the movement of said can-manipulating mechanism, substantially as set forth.

14. The combination, in a cooking and can-filling machine, of a water-supply pipe, I, a flexible section, i, therein, the shaft F, having an arm, and a bell-crank lever, I', pivoted to the frame-work, one end resting upon said flexible section of pipe and the other against the arm on the shaft, whereby when said shaft is rocked the flexible section will be compressed, substantially as set forth.

15. A combined cooking and can-filling apparatus consisting of a cooking apparatus arranged with a can-filling apparatus to discharge into the hopper thereof, substantially as set forth.

In witness whereof I have hereunto set my hand and seal, at Indianapolis, Indiana, this 18th day of August, A. D. 1887.

JOHN J. BISHOP. [L. S.]

In presence of—
C. BRADFORD,
CHARLES L. THURBER.